United States Patent

Marion et al.

[11] 3,866,411
[45] Feb. 18, 1975

[54] GAS TURBINE PROCESS UTILIZING PURIFIED FUEL AND RECIRCULATED FLUE GASES

[75] Inventors: Charles P. Marion, Mamaroneck, N.Y.; Warren G. Schlinger, Pasadena, Calif.; Albert Brent, Dix Hills; James R. Muenger, Beacon, both of N.Y.

[73] Assignee: Texaco Inc., New York, N.Y.

[22] Filed: Dec. 27, 1973

[21] Appl. No.: 428,980

[52] U.S. Cl............. 60/39.02, 60/39.12, 60/39.46, 60/39.05, 60/39.52, 48/215, 252/373, 60/39.18 B
[51] Int. Cl............................................. F02b 43/12
[58] Field of Search............ 60/39.12, 39.46, 39.02, 60/39.05, 39.52, 39.18 B; 48/215, 213, 206

[56] References Cited
UNITED STATES PATENTS

| | | | |
|---|---|---|---|
| 3,002,347 | 10/1961 | Sprague | 60/39.12 |
| 3,020,715 | 2/1962 | Thomsen | 60/39.12 |
| 3,446,014 | 5/1969 | Foster-Pegg | 60/39.18 B |
| 3,620,699 | 11/1971 | Reynolds et al. | 48/213 |
| 3,709,669 | 1/1973 | Marion et al. | 48/215 |
| 3,759,036 | 9/1973 | White | 60/39.05 |
| 3,816,332 | 6/1974 | Marion | 48/215 |

FOREIGN PATENTS OR APPLICATIONS

| | | | |
|---|---|---|---|
| 1,006,743 | 10/1965 | Great Britain | 60/39.02 |

Primary Examiner—C. J. Husar
Assistant Examiner—Warren Olsen
Attorney, Agent, or Firm—T. H. Whaley; C. G. Ries

[57] ABSTRACT

Gas turbines for producing mechanical and electrical power without polluting the atmosphere are fueled by an improved clean fuel gas having a heat of combustion of preferably about 70–100 BTU/SCF. Fuel-gas is produced by the partial oxidation of a hydrocarbonaceous fuel in a free-flow non-catalytic fuel gas generator. Feedstock to the fuel gas generator may include high ash, high sulfur, hydrocarbonaceous fuel. Pollutants are separated from the process stream of fuel gas, and a $CO_2$-rich stream is recovered. Optionally, this $CO_2$-rich stream may be used either as a portion of the temperature moderator in the gas generator or in a noncatalytic, thermal, reverse water-gas shift reaction with hydrogen in the process fuel gas stream to increase the mole ratio ($CO/H_2$), or both.

The clean fuel gas is burned in the combustion chamber of a gas turbine with a gaseous oxidizing stream which comprises air and a portion of the exhaust flue gas from said power-developing expansion turbine. Preferably, a portion of the exhaust flue gas may be passed through a heat exchanger in indirect heat exchange with the clean flue gas on its way to the gas turbine combustor. A remaining portion of said exhaust flue gas is passed through a heat exchanger in indirect heat exchange with said compressed gaseous oxidizing stream feeding said combustor.

28 Claims, 1 Drawing Figure

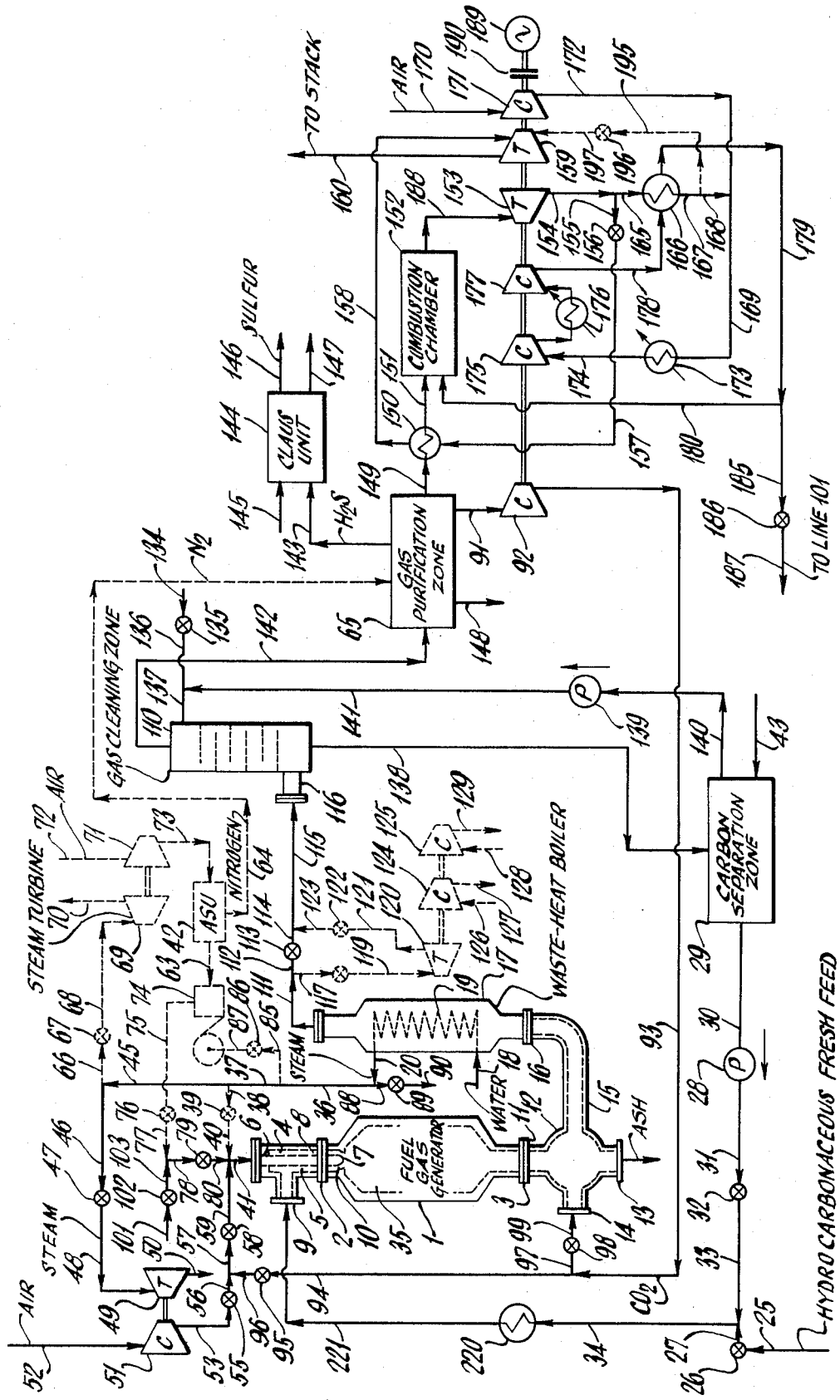

1

GAS TURBINE PROCESS UTILIZING PURIFIED FUEL AND RECIRCULATED FLUE GASES

BACKGROUND OF THE INVENTION

1. Field of the Invention

This invention pertains to the production and the burning of clean fuel gas in gas turbines. More specifically it relates to the production of an improved fuel gas from ash and sulfur-containing carbonaceous fuels and to the use of said improved fuel gas in gas turbines for the production of mechanical and electric power with substantially no associated environmental pollution.

2. Description of the Prior Art

The sequence of operations in a conventional gas turbine of the simplest type includes compressing air by a centrifugal or axial compressor, burning a fuel with said compressed air in a combustion chamber, and passing the hot gases produced through an expansion turbine. Some of the turbine power may be used to drive a compressor which may be attached to the same shift. The remaining turbine power is commonly transmitted to a generator for producing electrical energy.

While as shown in the prior art, it may be economically desirable to fire low grade coal and residual oil fuels directly in the combustion chamber of a gas turbine, it has not been proven practical to do so when the fuels contain high amounts of ash or sulfur. Such high ash solid fuels generally release solid abrasive and corrosive particles. When such particles are entrained in flue gas that is passed through an expansion turbine, they deposit on the turbine blades and erode the blade surfaces. When this occurs, blade form is spoiled; and gas passages in the turbine are clogged. Further, the fine particles may deposit on downstream heat-exchange surfaces where the resulting insulation will impair thermal efficiency. Similar problems are encountered when burning ash producing liquid petroleum products. Such ash includes mineral compounds, as those found in crude oil. These compounds are concentrated in the residuals by the refining process and are supplemented by silica, iron, and sodium compounds which are picked up in shipment and handling. Vanadium, nickel, sodium, sulfur, and oxygen are the major components of the ash. After burning, they appear as metallic oxides, sulfates, vanadates and silicates of sodium. These compounds appear to erode the protective oxide films on high temperature alloys. Oxidation is thereby accelerated, especially above about 1,200°F. Further, $SO_2$ in the flue gas exhaust from the expansion turbine pollute the atmosphere. Previous methods in which the fuel gas was cleaned prior to being introduced into the gas turbine were either impractical, unduly costly, or both.

The aforesaid problems are substantially avoided by the subject invention which integrates the gas turbine and a partial oxidation fuel gas generator in a highly efficient process for producing power without polluting the atmosphere.

SUMMARY

The subject process pertains to the generation of mechanical and electrical power using a gas turbine fueled by an improved fuel gas. The fuel gas may be produced by the noncatalytic partial oxidation of a low cost, high sulfur, high ash, hydrocarbonaceous fuel. The improved fuel gas produced has a heat of combustion in the range of about 75 to 350 BTU/SCF and preferably 75–100 BTU/SCF and has a mole ratio ($CO/H_2$) of at least about 0.30. When combusted in the gas turbine, there is substantially no associated environmental pollution.

The process consists essentially of the following steps:

1. reacting a hydrocarbonaceous fuel with a free-oxygen containing gas by partial oxidation in the presence of a temperature moderator in the reaction zone of a non-catalytic free-flow gas generator at an autogenous temperature in the range of about 1,500° to 3,500°F. and a pressure in the range of about 10 to 180 atmospheres absolute to produce an effluent gas stream comprising mixtures of $H_2$, $CO$, $CO_2$, and $H_2O$ and one or more members of the group $N_2$, $CH_4$, $COS$, $H_2S$, and $Ar$, and particulate carbon, and wherein said effluent gas stream has a mole ratio ($CO/H_2$) of at least 0.30;

2. cooling the effluent gas from (1) and introducing the cooled gas into a gas cleaning and purification zone and separately obtaining therefrom a stream of clean fuel gas comprising mixtures of $H_2$ and $CO$, and one or more members of the group $N_2$, $CH_4$, $CO_2$ and $H_2O$; a $CO_2$-rich gas stream; a slurry stream comprising particulate carbon in a liquid vehicle; and a gas stream rich in $H_2S$ and $COS$.

3. introducing into the combustion chamber of a gas turbine and burning therein the stream of clean fuel gas from (2) with a gaseous oxidizing stream produced subsequently in the process to produce a stream of clean flue gas; and 4. passing the stream of clean flue gas from (3) through an expansion turbine as the working fluid to develop power and to produce clean exhaust flue gas, and mixing at least a portion of said clean exhaust flue gas with air to produce the gaseous oxidizing stream in (3).

Preferably, the sensible heat in at least a portion of the clean exhaust flue gas from the expansion turbine in step (4) may be used to preheat the clean fuel gas entering the combustor. A second portion of said exhaust flue gas may be used to preheat a compressed gaseous oxidizing stream comprising air and a portion of said exhaust flue gas. This preheated oxidizing stream is introduced into the combustion chamber of the gas turbine. Suitably, a portion of said gaseous oxidizing stream may be introduced into the fuel gas generator. The gaseous oxidizing stream may be compressed by a compressor coupled to said expansion turbine.

Optionally, the mole ratio ($CO/H_2$) in the fuel gas stream may be increased by mixing a supplemental $CO_2$-rich gas stream recovered in the gas purification zone with said effluent gas stream from the gas generator and in a free-flow thermal shift conversion zone subjecting the resulting mixed gas stream to noncatalytic thermal reverse water-gas shift reaction at a temperature of at least 1,500°F.

DESCRIPTION OF THE INVENTION

The present invention pertains to an improved continuous process for producing thermal, electrical, and mechanical power by means of a gas turbine. Hydrocarbonaceous materials, including liquid and solid fuels containing a comparatively high content of ash and sulfur, may be used to produce a fuel gas in a separate noncatalytic free-flow partial oxidation synthesis gas generator. Optionally, by reverse thermal shift the mole ratio ($CO/H_2$) of the fuel gas may be increased.

The composition of the fuel gas may be further upgraded, for burning in a gas turbine integrated downstream in the process, by the steps of cooling by indirect heat exchange with water in a waste-heat boiler thereby making steam, and cleaning and purifying to remove solid suspended matter and sulfur compounds. The resulting improved fuel gas is then burned with a gaseous oxidant in the combustion chamber of a gas turbine to produce clean flue gas. As will be further described, the clean flue gas is passed into an expansion turbine as the working fluid, and power is produced. The aforesaid gaseous oxidizing stream comprises a mixture of air and a portion of the exhaust flue gas from said expansion turbine. Shaft power from the expansion turbine may be used to operate an electric generator, to compress said gaseous oxidant for introduction into the combustion chamber of said gas turbine, and to compress $CO_2$ for the noncatalytic thermal shaft. The sensible heat in the clean flue gas exhaust from the gas turbine is preferably used to preheat the clean fuel gas and the gaseous oxidizing stream prior to there introduction into the combustor. After heat exchange, the exhaust gas from the gas turbine may be discharged into the atmosphere with substantially no associated environmental pollution. This may be done preferably after the exhaust gas is further expanded through a power producing turbine. Suitably a portion of the exhaust flue gas from the gas turbine, with or without admixture with air, may be introduced into the gas generator. By keeping the heating value of the improved fuel gas in the range of about 75 to 350 BTU/SCF, the amount of oxides of nitrogen ($NO_x$) in the flue gas may be kept below 10 parts per million.

In the subject process, first a continuous stream of fuel gas is produced in the refractory lined reaction zone of a separate free-flow unpacked noncatalytic partial oxidation fuel gas generator. The gas generator is preferably a vertical steel pressure vessel, such as shown in the drawing and described in coassigned U.S. Pat. No, 2,992,906 issued to F. E. Guptill, Jr.

A wide range of combustible carbon containing organic materials may be reacted in the gas generator with a free-oxygen containing gas in the presence of a temperature-moderating gas to produce the fuel gas.

The term hydrocarbonaceous as used herein to describe various suitable feedstocks is intended to include gaseous, liquid, and solid hydrocarbons, carbonaceous materials, and mixtures thereof. In fact, substantially any combustible carbon containing organic material, or slurries thereof, may be included within the definition of the term "hydrocarbonaceous." For example, there are (1) pumpable slurries of solid carbonaceous fuels, such as coal, particulate carbon, petroleum coke, concentrated sewer sludge, and mixtures thereof; (2) gas-solid suspensions, such as finely ground solid carbonaceous fuels dispersed in either a temperature-moderating gas or in a gaseous hydrocarbon; and (3) gas-liquid-solid dispersions, such as atomized liquid hydrocarbon fuel or water and particulate carbon dispersed in a temperature - moderating gas. The hydrocarbonaceous fuel may have a sulfur content in the range of about 0 to 10 weight percent and an ash content in the range of about 0 to 15 weight percent.

The term liquid hydrocarbon, as used herein to describe suitable liquid feedstocks, is intended to include various materials, such as liquefied petroleum gas, petroleum distillates and residues, gasoline, naphtha, kerosine, crude petroleum, asphalt, gas oil, residual oil, tar-sand oil and shale oil, coal oil, aromatic hydrocarbons (such as benzene, toluene, xylene fractions), coal tar, cycle gas oil from fluid-catalytic-cracking operation, furfural extract of coker gas oil, and mixtures thereof. Gaseous hydrocarbon fuels, as used herein to describe suitable gaseous feedstocks, include methane, ethane, propane, butane, pentane, natural gas, water-gas, coke-oven gas, refinery gas, acetylene tail gas, ethylene off-gas, synthesis gas, and mixtures thereof. Both gaseous and liquid feeds may be mixed and used simultaneously and may include paraffinic, olefinic, naphthenic, and aromatic compounds in any proportion.

Also included within the definition of the term hydrocarbonaceous are oxygenated hydrocarbonaceous organic materials including carbohydrates, cellulosic materials, aldehydes, organic acids, alcohols, ketones, oxygenated fuel oil, waste liquids and by-products from chemical processes containing oxygenated hydrocarbonaceous organic materials and mixtures thereof.

The hydrocarbonaceous feed may be at room temperature; or it may be preheated to a temperature up to as high as about 600° to 1,200°F., but preferably below its cracking temperature. The hydrocarbonaceous feed may be introduced into the burner in liquid phase or in a vaporized mixture with a temperature moderator. Suitable temperature moderators include $H_2O$, $CO_2$-rich gas, a portion of the cooled clean exhaust gas from a gas turbine employed downstream in the process with or without admixture with air, by-product nitrogen from the air separation unit to be further described, and mixtures of the aforesaid temperature moderators.

The use of a temperature moderator to moderate the temperature in the reaction zone depends in general on the carbon to hydrogen ratio of the feedstock and the oxygen content of the oxidant stream. A temperature moderator may not be required with some gaseous hydrocarbon fuels; however, generally one is used with liquid hydrocarbon fuels and with substantially pure oxygen. When a $CO_2$-containing gas stream, e.g., at least about 3 mole % $CO_2$ (dry basis) is used as the temperature moderator, the mole ratio ($CO/H_2$) of the effluent product stream may be increased. As previously mentioned, the temperature moderator may be introduced in admixture with either or both reactant streams. Alternatively, the temperature moderator may be introduced into the reaction zone of the gas generator by way of a separate conduit in the fuel burner.

Optionally, in accordance with the subject invention, the mole ratio ($CO/H_2$) of the product gas used as fuel in a gas turbine may be increased. By this means a higher pressure ratio per turbine stage may be obtained, and less stages are therefore required. The size of the turbine is decreased, and its thermodynamic efficiency is increased. When a $CO_2$-containing temperature moderating gas stream, e.g., substantially pure $CO_2$ (at least 95 mole % $CO_2$ dry basis) recycle from the gas purification zone to be further described is used, the use of supplemental $H_2O$ is minimized and preferably omitted. Thus, advantageously the $CO_2$ produced in the system may be used as a temperature moderator in the gas generator, or it may be used in the reverse thermal shift to be further described, or it may be used in both places. As a temperature moderator, a gaseous stream comprising more than 3 mole % $CO_2$ at a temperature in the range of about ambient to 1,000°F. and slightly above generator pressure may be introduced into the reaction zone at a weight ratio of $CO_2$ to fuel in the range of about 0.3 to 1.0.

When comparatively small amounts of $H_2O$ are charged to the reaction zone, for example through the burner to cool the burner tip, the $H_2O$ may be mixed with either the hydrocarbonaceous feedstock, the free-oxygen containing gas, the temperature moderator, or combinations thereof. The weight ratio of water to hydrocarbonaceous feed may be in the range of about 0.0 to 1.0 and preferably 0.0 to less than 0.2.

The term free-oxygen containing gas, as used herein is intended to include air, oxygen-enriched air, i.e., greater than 21 mole % oxygen, and substantially pure oxygen, i.e. greater than 95 mole % oxygen, (the remainder comprising $N_2$ and rare gases). Free-oxygen containing gas may be introduced into the burner at a temperature in the range of about ambient to 1,800°F. The ratio of free oxygen in the oxidant to carbon in the feedstock (O/C, atom/atom) is preferably in the range of about 0.7 to 1.5.

The feedstreams are introduced into the reaction zone of the fuel gas generator by means of fuel burner. Suitably, an annulus-type burner, such as described in co-assigned U.S. Pat. No. 2,928,460 issued to duBois Eastman, et al., may be employed.

The feedstreams are reacted by partial oxidation without a catalyst in the reaction zone of a free-flow gas generator at an autogenous temperature in the range of about 1,500° to 3,500°F. and at a pressure in the range of about 10 to 180 atmospheres absolute (atm. abs.). The reaction time in the fuel gas generator is about 1 to 10 seconds. The mixture of effluent fuel gas leaving the gas generator may have the following composition (mole % -dry basis) if it is assumed that the rare gases are negligible: CO 15–57, $H_2$ 70–10, $CO_2$ 1.5–5, $CH_4$ 0.0–20, $N_2$ 0–75, $H_2S$ nil to 2.0 and COS nil to 0.1. Unreacted particulate carbon (on the basis of carbon in the feed by weight) is about 0.2 to 20 weight percent from liquid feeds but is usually negligible from gaseous hydrocarbon feeds. The mole ratio ($CO/H_2$) dry basis of the effluent gas from the generator is at least 0.30 and preferably in the range of 0.30 to 1.5.

The stream of hot effluent fuel gas leaving the gas generator is passed into a separate refractory lined steel chamber, preferably at a temperature in the range of about 1,500° to 3,500°F. as produced in the gas generator and about the same pressure, e.g., 10 to 180 atm. abs. and preferably 15 to 60 atm. abs. For example, spherical chamber 12, such as shown in the drawing and described in coassigned U.S. Pat. No. 3,565,588 may be used. The spherical chamber is unpacked and free from obstruction to the flow of gas therein. A portion of the solid matter that may be entrained in the effluent stream of fuel gas drops out and may be removed by way of an outlet located at the bottom of the spherical chamber which leads to a lock hopper, i.e., flanged outlet 13 in the drawing.

When it is desired to further increase the mole ratio ($CO/H_2$) in the effluent gas stream, the following noncatalytic thermal reverse water-gas shift conversion step may be employed. A stream of supplemental $CO_2$-rich gas, as recovered subsequently in the process, is simultaneously introduced into the spherical chamber at a temperature in the range of about 500° to 1,500°F. and at a pressure slightly above that in the gas generator. In such case on a dry basis, about 0.1 to 2.5 moles of supplemental $CO_2$ are preferably introduced into the spherical chamber per mole of effluent fuel gas from the gas generator. The gases mix and by noncatalytic thermal reverse water-gas shift reaction at a temperature of at least 1,500°F., and preferably in the range of about 1,500°F. to 2,800°F., the $CO_2$ reacts with a portion of the hydrogen in the effluent fuel gas stream from the generator so as to produce additional CO and $H_2O$. The mole ratio ($CO/H_2$) dry basis of the effluent stream of gas from the gas generator may be increased by this step from about 10–200%, and suitably about 15–50%. Thus, the effluent gas stream may leave the thermal shift zone with a mole ratio ($CO/H_2$) dry basis, in the range of greater than 0.3 to 6.0, preferably in the range of about 0.4 to 4.5 and advantageously greater than 1.5.

The aforesaid high temperature adiabatic noncatalytic thermal reverse water-gas shift reaction begins in the insulated spherical chamber and continues in the insulated line connecting the side outlet of the spherical chamber with the bottom flanged inlet to a waste heat boiler. Reference is made to coassigned U.S. Pat. No. 3,723,344. Thus the effluent stream of fuel gas is thermally shifted without a catalyst in transit between process stages. Residence time in the water gas shift conversion zone is in the range of about 0.1 to 5 seconds.

The aforesaid noncatalytic thermal reverse shift reaction takes place in a free-flow preferably adiabatic reaction zone, free from packing, which is separate from the fuel gas generator. Preferably, the conditions of temperature and pressure at which the reverse thermal shift reaction takes place are substantially the same as those in the fuel gas generator, less ordinary line drop and less any cooling due to the sensible heat of the supplemental $CO_2$ and the endothemic heat of reaction. Increasing the $CO/H_2$ ratio of the fuel gas will increase its heat of combustion per mole and increase its molecular weight. Thus at 298°K:

$CO + \frac{1}{2}O_2 \rightarrow CO_2 + 67.64$ kcal/g. mole 44 mol wt.
$H_2 + \frac{1}{2}O_2 \rightarrow H_2O(gas) + 57.80$ kcal/g. mole 18 mol wt.

Advantageously, this improves the downstream thermal efficiency of the fuel gas and permits the use of smaller gas turbines. Further, less than ½ the amount of excess air required for good combustion in the combustion chamber of the gas turbine need be used in the subject semi-closed cycle gas turbine in comparison with an open cycle gas turbine.

The stream of effluent fuel gas is then passed through an inline waste heat boiler in noncontact heat exchange with water. The stream of fuel gas is thereby cooled to a temperature in the range of about 500° to 750°F. By-product steam may be produced thereby at a temperature in the range of about 450° to 700°F. for use elsewhere in the process. For example the aforesaid steam may be used as a working fluid in an expansion turbine for the production of power, for example to drive the compressor in a conventional air separation unit. Optionally, the steam may be superheated to a temperature in the range of about 750° to 1,100°F., and the superheated steam may be used as the working fluid in a steam turbine. The superheating may be accomplished in a furnace, preferably fired by part of the clean fuel gas, in order to avoid environmental pollution.

The partially cooled stream of fuel gas leaving the waste heat boiler is passed into a gas cleaning zone where particulate carbon and any other entrained solids may be removed therefrom. Slurries of particulate carbon in a liquid hydrocarbon fuel may be produced in the cleaning zone which may be recycled to the fuel gas generator as at least a portion of the feedstock. Any conventional procedure suitable for removing suspended solids from a gas stream may be used. In one embodiment of the invention, the stream of fuel gas is introduced into a gas-liquid scrubbing zone where it is scrubbed with a scrubbing fluid such as liquid hydrocarbon or water. A suitable liquid-gas tray-type column is more fully described in Perry's Chemical Engineer's Handbook, Fourth Edition, McGraw-Hill 1963, Pages 18-3 to 5.

Thus, by passing the stream of process fuel gas up a scrubbing column in direct contact and countercurrent flow with a suitable scrubbing fluid or with dilute mixtures of particulate carbon and scrubbing fluid flowing down the column, the particulate carbon may be removed from the fuel gas. A slurry of particulate carbon and scrubbing fluid is removed from the bottom of the column and sent to a carbon separation or concentration zone. This may be done by any conventional means that may be suitable, e.g., filtration, certrifuge, gravity settling, or by liquid hydrocarbon extraction such as the process described in the previously mentioned coassigned U.S. Pat. No. 2,992,906. Clean scrubbing fluid or dilute mixtures of scrubbing fluid and particulate carbon are recycled to the top of the column for scrubbing more fuel gas.

Other suitable conventional gas cooling and cleaning procedures may be used in combination with or in place of the aforesaid scrubbing column. For example, the stream of fuel gas may be introduced below the surface of a pool of quenching and scrubbing fluid by means of a dip-tube unit. Or the stream of fuel gas may be passed through a plurality of scrubbing steps including an orifice-type scrubber or venturi or nozzle scrubber, such as shown in Perry's Chemical Engineer's Handbook, Fourth Edition, McGraw-Hill 1963, Pages 18-54 to 56.

Substantially no particulate carbon is produced with gaseous hydrocarbonaceous fuels, such as natural gas or methane. In such case, the aforesaid gas scrubbing step may not be necessary.

In a gas purification zone, $CO_2$, $H_2S$, COS, $H_2O$, $NH_3$ and other gaseous impurities may be removed from the cooled and cleaned stream of gas leaving the gas cleaning zone. Suitable conventional processes may be used involving refrigeration and physical or chemical absorption with solvents, such as methanol, n-methylpyrrolidone, triethanolamine, propylene carbonate, or alternately with amines or hot potassium carbonate.

In solvent absorption processes, most of the $CO_2$ absorbed in the solvent may be released by simple flashing. The rest may be removed by stripping. This may be done economically with nitrogen. Nitrogen may be available as a low cost by-product when a conventional air separation unit is used for producing substantially pure oxygen (95 mole % $O_2$ or more) for use as the oxygen-rich gas in the fuel gas generator. The regenerated solvent is then recycled to the absorption column for reuse. When necessary, final cleanup may be accomplished by passing the process gas through iron oxide, zinc oxide, or activated carbon to remove residual traces of $H_2S$ or organic sulfide. If desired, a stream of $CO_2$-rich gas comprising $CO_2$ in the range of about 25-100 mole %, and preferably more than 98.5% may be produced for use in the aforesaid noncatalytic thermal reverse water-gas shift step in the process. Optionally, a recovered stream of $CO_2$ may be recycled to the fuel-gas generator for use as all or a portion of the temperature-moderating gas. In such case, small amounts of $H_2S$ and COS may be contained in the $CO_2$ stream.

Similarly, the $H_2S$ and COS containing solvent may be regenerated by flashing and stripping with nitrogen, or alternatively by heating and refluxing at reduced pressure without using an inert gas. The $H_2S$ and COS are then converted into sulfur by a suitable process. For example, the Claus process may be used for producing elemental sulfur from $H_2S$ as described in Kirk-Othmer Encyclopedia of Chemical Technology, Second Edition Volume 19, John Wiley, 1969, Page 353. Excess $SO_2$ in the Claus plant tail gases may be removed and discarded in chemical combination with limestone, or by means of a suitable commercial extraction process. In general, the composition of the clean fuel gas in mole percent (dry basis) is about: $H_2$ 10 to 60, CO 15 to 60, $CH_4$ 0.0 to 25, $CO_2$ 0.0 to 5, $N_2$ 0.0 to 75. The Heat of Combustion in BTU/SCF is at least 70, suitably 75-350, and preferably 75 to 150, i.e., 90.

The stream of clean fuel gas from the gas purification zone is at a temperature in the range of about 100 to 800°F. and at a pressure in the range of about 10 to 180 atm. abs. and preferably 15 to 60 atm. abs. Most preferably, the pressure of the fuel gas at this point is substantially the same as that produced in the fuel gas generator less ordinary line drop. Optionally, but preferably, the stream of fuel gas is preheated to a temperature in the range of about 400° to 800°F. by indirect heat exchange with a portion of a hot stream of exhaust flue gas from the main expansion turbine downstream in the process, before it is introduced into the combustor of the gas turbine. About 1.0 to 3.0 volumes of gaseous oxidizing stream is simultaneously introduced into the combustor per volume of clean fuel gas. The gaseous oxidizing stream comprises a free-oxygen containing gas (preferably air) in admixture with a portion of the exhaust flue gas from an expansion turbine, to be further described. The ratio of free-oxygen containing gas to flue gas by volume is in the range of about 0.20 to 2.0 and preferably 0.4 to 1.2. The preheated stream of clean fuel gas is then combusted with said gaseous oxidizing stream in the combustion chamber of a gas turbine.

When the gaseous oxidizing stream is introduced into the combustion chamber of the gas turbine at a temperature in the range of about 400° to 800°F. and at substantially the same pressure as the fuel gas, the clean flue gas leaving the combustion chamber at a temperature in the range of about 1,400° to 3,000°F. and usually 1,600° to 2,100°F., and at a pressure in the range of about 50 to 1,000 psig or higher and preferably 100 to 400 psig or higher has the following typical analysis in mole percent; $CO_2$ 4-10, $H_2O$ 3-6, $N_2$ 75-85, and $O_2$ 5-10. Only very small concentrations of oxides of nitrogen ($NO_x$) may be found in the flue gas. This is due to the comparatively low temperature in the combustion chamber, which is primarily the result of the comparatively low adiabatic flame temperature of the improved fuel gas. Further, the $SO_2$ content of the flue gas is nil; and entrained particulates are negligible.

The clean flue gas leaving the combustion chamber is passed through at least one power-developing expansion turbine as the working fluid. Coupled through a variable-speed drive for example to the axis of the turbine and driven thereby may be at least one electric generator and at least one turbocompressor. The gaseous oxidizing stream prior to introduction into the combustion chamber of the gas turbine and carbon dioxide from the gas purification zone prior to recycle to the fuel gas generator or to the aforesaid spherical mixing chamber may be compressed by means of said turbocompressors to the proper pressure, e.g., over 10 to 190 atm. abs.

The clean exhaust flue gas leaves the main expansion turbine at a temperature in the range of about 800° to 1,200°F and a pressure in the range of about 1.0 to 7.0 atmospheres absolute. From about 0 to 50 volume percent of this stream may be optionally separated and passed through a heat exchanger in indirect (noncontact) heat exchange with the clean fuel gas on its way to the combustion chamber (combustor) of the gas turbine, as previously described. After heat exchange, the cooled clean exhaust flue gas may be discharged to the atmosphere by way of a stack. There is substantially no atmospheric pollution as the gaseous impurities were previously removed. Preferably, the stream of heat exchanged exhaust flue gas is vented after further expansion in a power producing turbine.

The remainder of the stream of clean exhaust flue gas from the main expansion turbine is passed through a heat exchanger in indirect heat exchange with said compressed gaseous oxidizing stream. In this manner said gaseous oxidizing stream may be preheated to a temperature in the range of about 300° to 800°F. prior to its introduction into the combustion chamber of the gas turbine. From about 20 to 70 volume percent of the stream of exhaust flue gas cooled by the aforesaid indirect heat exchange to a temperature in the range of about 100° to 300°F. may be vented to the atmosphere without causing pollution, preferably after further expansion in a power producing turbine. The remainder of the cooled stream of exhaust flue gas is mixed with a free-oxygen containing gas to produce said gaseous oxidizing stream. The free-oxygen containing gas may be selected from the group consisting of air, oxygen enriched air (greater than 21 mole % $O_2$), and substantially pure oxygen (greater than 95 mole $O_2$).

Thus, preferably air at ambient conditions of temperatures and pressure may be introduced into the system by means of a charging compressor coupled to the shaft of the main expansion turbine. The mixture of air and exhaust flue gas has been previously referred to as the gaseous oxidizing stream; and it has the following typical analysis in mole percent; $CO_2$ 3.0 to 5.0, $H_2O$ 1.0 to 4.0, $N_2$ 75 to 85, $O_2$ 10 to 20, and Ar 0.9 to 1.5.

The gaseous oxidizing stream is compressed to the desired pressure in the range of about 5 to 65 atmospheres absolute in at least one compressor preferably coupled to the shaft of the main expansion turbine. Usually, the gas stream is cooled before and between compressors. The gaseous oxidizing stream is then preheated and introduced into the combustor as previously described. Optionally, from about 0 to 20 volume percent of the gaseous oxidizing stream may be introduced into the gas generator as at least a portion of said temperature moderating gas.

Optionally, the process fuel gas produced in the gas generator and cooled in the waste heat boiler may be used as the working fluid in an in-line power developing expansion turbine located for example after the waste-heat boiler, and suitably after the gas cleaning zone, or after the gas purification zone.

DESCRIPTION OF THE DRAWING

A more complete understanding of the invention may be had by reference to the accompanying schematic drawing which shows the previously described process in detail. Although the drawing illustrates a preferred embodiment of the process of this invention, it is not intended to limit the continuous process illustrated to the particular apparatus or materials described With reference to the drawing, free-flow noncatalytic refractory lined fuel gas generator 1 as previously described is equipped with axially aligned upstream flanged inlet port 2 and downstream flanged exit port 3. Annulus type burner 4, as previously described, with center passage 5 in alignment with the axis of gas generator 1 is mounted in inlet port 2. Passage 5 has an upstream end 6 and a conical shaped downstream end 7. A concentric coaxial annulus passage 8 with upstream inlet 9 and a downstream conical shaped discharge port 10 is also provided.

Connected to exit port 3 of gas generator 1 is flanged inlet port 11 of a refractory lined free-flow spherical shaped chamber 12. Chamber 12 has a downstream normally closed ash removal flanged outlet port 13, a side flanged inlet port 14, and a refractory lined side discharge duct 15 whose downstream end 16 is connected to waste-heat boiler 17. For example, water in line 18 is passed through tubing 19 within boiler 17 in indirect heat exchange with hot gases passing on the outside of the tubing. The water is vaporized and leaves as steam by way of line 20. Other suitable boilers may be used.

Hydrocarbonaceous feed in liquid or vapor form, as previously described, may be introduced into the system by way of line 25, valve 26, and lines 27 and 34. Further, by means of pump 28, concentrated slurries of particulate carbon in water or liquid hydrocarbon fuels may be pumped from carbon separation zone 29 through lines 30, 31, valve 32, line 33 and into line 34 where mixing of the feedstreams may take place. The feed mixture is then preferably preheated in heat exchanger 220 and introduced into the reaction zone 35 of gas generator 1 by way of line 221, inlet 9 and annulus passage 8 or burner 4.

A portion of the steam produced in waste heat boiler 17 may be passed into reaction zone 35 as a temperature moderating fluid by way of line 20, lines 36–38, valve 39, lines 40, 41, and center passage 5 of burner 4. A second portion of steam from boiler 17 may be used as the working fluid in a steam turbine. For example, the steam may be passed through lines 20, 36, 37, 45, 46, valve 47, and line 48 into expansion turbine 49. Exhaust steam leaves by line 50. Expansion turbine 49 drives turbocompressor 51 which compresses the air which enters by way of line 52 and which leaves the compressor by way of line 53. The compressed air may be then introduced into reaction zone 35 of gas generator 1 by way of line 53, valve 55, lines 56, 57, valve 58 and lines 59, 41, and center passage 5 of burner 4.

Optionally, all or a portion of the air from turbocompressor 51 may be replaced in gas generator 1 by substantially pure oxygen. Oxygen and nitrogen may be produced in an associated conventional air separation unit ASU 42 from which substantially pure oxygen leaves by way of line 63 and nitrogen leaves by way of line 64. Nitrogen may be used subsequently in the process in gas purification zone 65. A portion of the steam produced in waste heat boiler 17 may be used to power steam turbine 69. In such case the steam is passed through lines 20, 36, 37, 45, 66, valve 67, line 68, and through steam turbine 69 as the working fluid, leaving by line 70. Air is passed into coupled turbocompressor 71 by way of line 72. The air is compressed and then passed into air separation unit 42 by way of line 73. Oxygen in line 63 is compressed by steam driven reciprocating or centrifugal compressor 74 and then is passed through line 75, valve 76, lines 77, 78, valve 79, lines 80, 41, and into center passage 5 of burner 4. Steam for driving compressor 74 may be obtained from boiler 17 by way of line 20, 36, 85, valve 86, and line 87. Power requirements for the air separation unit may be minimized by producing a free-oxygen containing gas comprising in mole % $O_2$ 60–80%.

Suitably, in place of or in combination with steam, the temperature moderating gas introduced into reaction zone 35 may be a $CO_2$-containing gas, e.g., a mixture of air and turbine exhaust gas as produced subsequently in the process from line 187, or a $CO_2$-rich stream with or without a small amount of $H_2S$, COS from line 91, or a mixture of both. The $CO_2$-rich stream may be obtained subsequently in the process from gas purification zone 65 during purification of the effluent flue gas stream produced in gas generator 1. Thus, $CO_2$-rich stream leaving gas purification zone 65 by way of line 91 may be compressed in turbocompressor 92, and then passed into reaction zone of gas generator 1 by way of lines 93, 94, valve 95, lines 96, 57, valve 58, lines 59, 41, and center passage 5 of burner 4. Preferably, a portion of said $CO_2$-rich stream may be introduced into spherical mixing chamber 12 by way of line 97, valve 98, line 99 and flanged inlet 14 where reverse noncatalytic thermal water-gas shift takes place with a portion of the hydrogen in the effluent fuel gas leaving gas generator 1, thereby increasing the mole ratio ($CO/H_2$) of the process fuel gas stream.

Thus, optionally, a compressed gaseous oxidizing stream produced subsequently in the process in line 187 may be introduced into reaction zone 35 of gas generator 1 as the temperature moderator. For example, it may be introduced by way of line 101, valve 102, lines 103, 78, valve 79, lines 80, 41, and center passage 5 of burner 4. Substantially pure oxygen from line 77 may be mixed with the stream of oxidizing gas in line 78. Alternatively, a portion of the gaseous oxidizing stream may be introduced into the reaction zone in admixture with hydrocarbonaceous feed.

The effluent fuel gas produced in reaction zone 35 of gas generator 1 is optionally mixed with $CO_2$ in spherical chamber 12, thermally shifted therein and also in duct 15, and cooled in waste heat boiler 17. The cooled process gas stream is passed into a conventional gas cleaning zone 110 by way of lines 111, 112, valve 113, lines 114, 115, and flanged inlet 116. Optionally, all or a portion of the partially cooled effluent gas stream may be used as the working fluid in one or more expansion turbines located in different points in the system, e.g., before or after the gas cleaning zone 110 or the gas purification zone 65. For example, the effluent stream of raw fuel gas in line 111 may be passed through line 117 valve 118, and line 119 into expansion turbine 120. The fuel gas leaving turbine 120 is passed through line 121, valve 122, lines 123, 115 and flanged inlet 116. Turbocompressors 124, and 125 are driven by expansion turbine 120 and may be used to compress other fluids in the system. For example, nitrogen may be introduced into compressor 124 by way of line 126 and discharged by line 127. Air may be introduced into compressor 125 by way of line 128 and discharged by way of line 129.

Raw effluent fuel gas from fuel gas generator 1 that is partially cooled in waste heat boiler 17 is cooled further and cleaned in gas cleaning zone 110 by being directly contacted and scrubbed with clean scrubbing fluid or a recycled and dilute slurry of particulate carbon and scrubbing fluid. The clean scrubbing fluid may be introduced into the gas cleaning zone by way of line 134, valve 135, and lines 136 and 137. For example, the gas cleaning zone may be a vertical scrubbing column with a plurality of horizontal trays. In such instance as the gas passes up through the tower, it is contacted on each tray by a scrubbing fluid, e.g., water or liquid hydrocarbon flowing by gravity down the tower. Particulate carbon is thereby scrubbed from the fuel gas. The fuel gas becomes progressively cleaner as it passes up the scrubbing column while the concentration of particulate carbon in scrubbing fluid becomes progressively greater as it passes down the column. The slurry of particulate carbon and scrubbing fluid passes out from the bottom of scrubbing column 110 and into a carbon separation zone 29 by way of line 138.

In carbon separation zone 29, the slurry of particulate carbon and scrubbing fluid may be processed in a conventional manner as previously described to produce a stream of clean scrubbing fluid, and a separate slurry stream of particulate carbon in a liquid vehicle. Thus, from line 138 of gas cleaning zone 110 a slurry comprising about 2 wt. % of particulate carbon in water is mixed with naphtha and introduced into a decanter (not shown) in carbon separation zone 29. A dispersion of particulate carbon and naphtha is formed and clean water is drawn off from the decanter and recycled as at least a portion of the scrubbing fluid to gas cleaning zone 110 by way of line 140, pump 139 and lines 141 and 137. Fresh heavy liquid hydrocarbon fuel oil from line 43 is introduced into a distillation column (not shown) in carbon separation zone 29 along with the particulate carbon-naphtha dispersion from the decanter. Naphtha is removed from the top of the distillation column and recycled for extracting more water from the particulate carbon slurry. By means of pump 28 a preheated slurry of particulate carbon and heavy liquid hydrocarbon fuel oil from the bottom of the distillation column may be pumped through lines 30, 31 valve 32, lines 33, 34, preheater 220, line 221, inlet 9, and annulus passage 8 into reaction zone 35 of gas generator 1 as previously described.

The stream of clean fuel gas leaving gas cleaning zone 110 is introduced into a conventional gas purification zone 65 by way of line 142. $H_2S$ and COS are removed from the fuel gas and leave separation zone 65 by way of line 143. In Claus Unit 144, the $H_2S$ is burned with air from line 145 to produce solid sulfur for export in line 146 and water in line 147. Excess nitrogen and other non polluting gaseous impurities may be vented by way of line 148.

The stream of clean fuel-gas in line 149 is preheated in heat exchanger 150 and is introduced into gas turbine combustion chamber 152 by way of line 151. The temperature of the clean fuel gas may be increased in heat exchanger 150 by indirect heat exchange with a portion of exhaust gas from main turbine 153 before it is discharged into the atmosphere. For example, a portion of exhaust gas passes through line 155, valve 156, line 157, heat exchanger 150, line 158, turbine 159, and line 160 to the stack.

Simultaneously, another portion of exhaust gas from turbine 153 is passed through line 165, heat exchanger 166, lines 167, 168, and 169 where it is mixed with air, which enters the system through line 170, turbocompressor flue gas in line 169, hereafter referred to as the gaseous oxidizing stream, is cooled in heat exchanger 173 and passed through line 174, turbocompressor 175, intercooler 176, turbocompressor 177, line 178, heat exchanger 166, lines 179, 180 and into combustion chamber 152. Suitably, a portion of the preheated gaseous oxidizing stream in line 179 may be introduced into fuel gas genenrator 1 by way of lines 185, valve 186, and lines 187 and 101.

The clean fuel gas is combusted in combustion chamber 152 to produce clean flue gas which leaves by way of line 188. The flue gas is then passed through main expansion turbine 153 as the working fluid. Turbocompressors 92, 175, 177, and 171, as well as electric generator 189 are driven by expansion turbines 153 and 159. These units may be coupled to the same shaft or connected for example by a fluid coupling, i.e., 190.

As previously mentioned, clean hot exhaust flue gas leaves main expansion turbine 153 by way of line 154 and is suitably split into two streams, i.e., lines 155 and 165. The volume of gas in each stream may be determined by conventional heat and weight balances. Optionally, a portion of the exhaust gas from turbine 153 may be drawn off before or after heat exchanger 166 and vented to the atmosphere. For example, exhaust gas may be passed through line 195, valve 196, line 197 turbine 159, and line 160. The clean exhaust flue gas in line 160 may be discharged into the atmosphere via a stack without causing pollution, preferably through work producing expansion turbine 159. Optionally, a portion of the clean exhaust gas in line 160 may introduced into the gas generator in the front end of the system by way of line 101.

Alternatively, the relatively low-temperature heat which can be recovered from the gas-turbine cycle, e.g., stream of exhaust gas in line 154 can be used as an energy source for absorption refrigeration. This refrigeration could then be employed for air separation and $CO_2$ removal by condensation or by absorption in a solvent at low temperature. The aforesaid exhaust gas may also be used for preheating the feedstreams of the gas generator, preheating the scrubbing fluid going into the gas cleaning zone, or for raising steam. The low-temperature heat could also be used for regenerating liquid absorbents for $CO_2$ such as MEA and $K_2CO_3$ solution.

Turbine driven electric generator 189 may provide electric power for driving essential mechanical and electrical equipment and instruments in the process including the gas-generation and air separation systems. The remainder of the electric power is exported. This design has a major practical advantage in making operation of the plant independent from outside electric-power sources. Alternately, mechanical power at coupling 190 may be exported.

EXAMPLE

The following example illustrates preferred embodiments of the process of this invention pertaining to the producing of an improved fuel gas and burning said fuel gas in a gas turbine which is integrated in the system. While preferred modes of operation are illustrated, the example should not be construed as limiting the scope of the invention. The process is continuous and the flow rates are specified on an hourly basis for all streams of materials. 15,056,400 standard cubic feet (SCF) of fuel gas are produced by partial oxidation of an hydrocarbonaceous fuel to be further described with air in a conventional vertical noncatalytic free-flow refractory-lined fuel gas generator. A portion of the exhaust flue gas from a gas turbine located downstream in the process in admixture with air is introduced into the reaction zone to moderate the temperature therein. The fuel gas is produced in the generator at an autogenous temperature of about 2,180°F. and at a pressure of about 27 atm. absolute. The average residence time in the gas generator is about 2 seconds. The fuel gas leaving the generator has the following composition in mole percent: CO 15.51, $H_2$ 10.17, $CO_2$ 4.55, $H_2$ 5.12, $N_2$ 63.71, $CH_4$ 0.00, Ar 0.80, $H_2S$ 0.15, COS 0.01. About 4,800 pounds of unconverted particulate carbon are entrained in the effluent stream of fuel gas. The molecular weight of the dry fuel gas after $H_2O$ particulates, $CO_2$, and $H_2S$ are removed in a downstream gas purification zone is 25.17 and the net or lower heat of combustion is 82.6 BTU/SCF.

The aforesaid fuel gas is produced by continuously introducing into a partial oxidation fuel gas generator by way of an annulus type burner the following charge: a hydrocarbonaceous fuel consisting of 104,804 pounds of a pumpable slurry produced subsequently in the process. The slurry is preheated to a temperature of about 500°F. and comprises 4,804 pounds of particulate carbon and 100,000 pounds of reduced crude oil having the following ultimate analysis (Wt.%) C 86.1%, $H_2$ 11.0%, S 2.0%, $N_2$ 0.8%, and ash 0.01. Further, the reduced crude oil has an API gravity of 10.9, a heat of combustion of 18,278 BTU per pound, and a viscosity of 822 Saybolt Seconds Furol at 122°F. Also, about 6,825,000 SCF of air and 4,985,000 SCF of said flue gas in admixture at a temperature of 500°F. are introduced into the reaction zone of the gas generator by way of said burner.

All of the hot effluent fuel gas leaving the gas generator is passed through a refractory-lined spherical free-flow chamber located at the downstream exit of the fuel gas generator. A portion of the entrained solids drop out of the stream of fuel gas and are removed by way of a port located in the bottom of the spherical chamber. By means of a waste heat boiler and indirect heat exchange with water as a coolant, the stream of fuel gas is cooled to a temperature of about 800°F. Simultaneously, steam at a temperature of about 800°F. is produced in the waste heat boiler. Optionally, a portion of the steam may be used to operate compressors in a conventional air separation unit for producing substantially pure oxygen and nitrogen. Optionally, the oxygen produced may be introduced into the gas generator, and the nitrogen may be introduced into a gas purification zone located downstream in the process to effect separation of the gaseous impurities.

Substantially all of the particulate carbon and any remaining solids are removed from the stream of fuel gas in a conventional gas-liquid scrubbing column. A slurry of particulate carbon and crude oil is produced and introduced into the gas generator as a feedstock, as previously described. $CO_2$, $H_2S$, COS, and optionally $H_2O$, are removed from the stream of fuel gas in a gas purification zone, and a stream of improved clean fuel gas is produced substantially having the following composition (dry basis) mole % $H_2$ 11.37, CO 17.34, $N_2$ 70.39 and Ar 0.90. The stream of about 13,463,000 SCF of clean fuel gas is introduced into the combustion chamber of a gas turbine at a temperature of about 800°F. and a pressure of about 20 atm. abs. Simultaneously about 25,313 lbs. of a gaseous oxidizing stream comprising a mixture in volume percent of air 57,79, and exhaust flue gas 42.21 from an expansion turbine to be further described at substantially the same temperature and pressure as said clean fuel gas, and optionally $H_2O$, are passed into the combustion chamber where the fuel gas is combusted. 44,579,000 SCF of clean flue gas at a temperature of about 2,000°F., and a pressure of about 15 atmospheres, are produced comprising in mole percent $N_2$ 79.17, $CO_2$ 7.79, $H_2$ 4.99, Ar 1.015 and $O_2$ 6.784. The clean flue gas is passed through an expansion turbine which produces about 338,900 horsepower. Coupled to the shaft of the turbine and driven thereby is an electric generator, and also at least one compressor for compressing said gaseous oxidizing stream and delivering at least a portion to the combustion chamber of the gas turbine.

The exhaust flue gas discharged from the expansion turbine at a temperature of about 945°F. and a pressure of about 1.5 atmosphere absolute is advantageously split into two streams. 25,867,000 SCF of said flue gas are passed through a heat exchanger 150 in indirect (noncontact) heat exchange with said clean fuel gas on the way to said combustion chamber. After said heat exchange, the exhaust flue gas at a temperature of 600°F. is passed through a turbine and into the atmosphere without causing pollution. This turbine will deliver about 15,600 horsepower.

The remainder of the stream of exhaust flue gas from the main expansion turbine is passed through a heat exchanger 166 in indirect heat exchange with the gaseous oxidizing stream comprising 26,131,000 SCF of air and 19,354,000 SCF of said exhaust flue gas. Prior to said heat exchange the gaseous oxidizing stream is compressed by means of at least one compressor preferably powered by the main expansion turbine to a pressure which is slightly above that in said fuel gas generator. As previously mentioned at least a portion of the gaseous oxidizing stream preheated to a temperature of about 800°F. is introduced into the combustion chamber of the gas turbine.

To demonstrate an embodiment of the invention in which a portion of the $CO_2$ recovered in the gas purification zone is utilized in improving the composition of the fuel gas by increasing its molecular weight and heat of combustion, about 1,898,000 SCF of $CO_2$-rich gas containing more than 95 mole % $CO_2$ from the gas purification zone are compressed by a turbocompressor driven by the main gas turbine to a pressure slightly above that in the fuel gas generator. At a temperature of about 800°F. the compressed stream of $CO_2$ is introduced into a free-flow refractory lined vessel, such as spherical vessel 12 in the drawing, and mixed therein with about 15,048,000 SCF of effluent fuel gas leaving the gas generator at a temperature of about 2,180°F. At a temperature above 1,500°F., noncatalytic adiabatic thermal reverse water-gas shift reaction between $CO_2$ and $H_2$ takes place in free flow refractory lined chamber 12 and line 15 to increase the mole ratio ($CO/H_2$) of the process gas stream flowing therein. An improved fuel gas is produced having the following composition in mole %: CO 16.61, $H_2$ 6.23, $CO_2$ 13.25, $H_2O$ 7.05, $N_2$ 56.00, $CH_4$ 0.00, Ar 0.72, $H_2S$ 0.13, COS 0.01.

The molecular weight of the thermally shifted dry fuel gas after $CO_2$ and $H_2S$ are removed is increased to 26.09, and the net or lower heat of the combustion per mole is increased to 88.3 BTU/SCF. When this fuel gas is burned in the combustor, the expander output is increased in comparison with the fuel gas produced in the previous embodiment. Further, in comparison with an open-cycle process where all of the exhaust flue gas from the expansion turbine is discharge directly into the atmosphere, by means of the subject invention less than 1/10 to ½ of the excess air intake is required for efficient combustion.

The process of the invention has been described generally and by examples with reference to hydrocarbonaceous feedstocks and scrubbing fluids of particular compositions for purposes of clarity and illustration only. From the foregoing it will be apparent to those skilled in the art that various modifications of the process and the raw materials disclosed herein can be made without departure from the spirit of the invention.

We claim:

1. A process for the generation of power by means of a gas turbine having a combustion chamber and an expansion turbine comprising 1. reacting a hydrocarbonaceous fuel with a free-oxygen containing gas by partial oxidation in the presence of a temperature moderator in the reaction zone of a non-catalytic free-flow gas generator at an autogenous temperature in the range of about 1,500° to 3,500°F. and a pressure in the range of about 10 to 180 atmospheres absolute to produce an effluent gas stream comprising mixtures of $H_2$, CO, $CO_2$, and $H_2O$ and one or more members of the group $N_2$, $CH_4$, COS, $H_2S$ and Ar, and particulate carbon, and wherein the mole ratio ($CO/H_2$) dry basis of the effluent gas from the generator is at least 0.30;
   2. cooling the effluent gas from (1) and introducing the cooled gas into a gas cleaning and purification zone and separately obtaining therefrom a stream of clean fuel gas comprising mixtures of $H_2$ and CO and one or more members of the group $N_2$, $CH_4$, $CO_2$ and $H_2O$; a $CO_2$-rich gas stream; a slurry stream comprising particulate carbon in a liquid vehicle; and a gas stream rich in $H_2S$ and COS.
   3. introducing into the combustion chamber of a gas turbine and burning therein the stream of clean fuel gas from (2) with a gaseous oxidizing stream produced subsequently in the process to produce a stream of clean flue gas; and
   4. passing the stream of clean flue gas from (3) through an expansion turbine as the working fluid to develop power and to produce clean exhaust flue gas, and mixing at least a portion of said clean exhaust flue gas with air to produce the gaseous oxidizing stream in (3).

2. The process of claim 1 provided with the steps of compressing the gaseous oxidizing stream from step (4) in at least one compressor coupled to said expansion turbine and preheating said gaseous oxidizing stream by indirect heat exchange with at least a portion of the exhaust flue gas leaving the expansion turbine in step (4) prior to introducing at least a portion of said gaseous oxidizing stream into the combustion chamber in step (3).

3. The process of claim 2 provided with the step of introducing a portion of said preheated gaseous oxidizing stream into the gas generator as at least a portion of said temperature moderator.

4. The process of claim 2 provided with the step after said heat exchange of discharging a portion of the cooled clean exhaust flue gas to the atmosphere by way of a power generating expansion turbine.

5. The process of claim 1 provided with the step of preheating the improved fuel gas prior to burning it in step (3) by indirect heat exchange with a portion of the clean exhaust flue gas from step (4) which is thereby cooled.

6. The process of claim 5 provided with the step after said heat exchange of discharging the cooled clean exhaust flue gas to the atmosphere by way of a power generating expansion turbine.

7. The process of claim 1 wherein steps (1) through (3) are conducted at substantially the same pressure less ordinary drop in the line.

8. The process of claim 1 wherein at least a portion of the temperature moderator in step (1) is a material selected from the group consisting of $H_2O$, a $CO_2$-rich gas stream as obtained from step (2), and mixtures thereof.

9. The process of claim 1 wherein the effluent gas stream from step (1) is cooled, and at a pressure substantially that of said gas generator less ordinary line drop is passed through an expansion turbine located upstream from said gas turbine combustor.

10. The process of claim 1 wherein the freeoxygen containing gas in steps (1) and (4) is selected from the group consisting of air, oxygen-enriched air (more than 21 mole % $O_2$) and substantially pure oxygen (more than 95 mole % $O_2$).

11. The process of claim 1 wherein said hydrocarbonaceous fuel is a liquid hydrocarbon selected from the group consisting of liquefied petroleum gas; petroleum distillates and residues, gasoline, naphtha, kerosine, crude petroleum, asphalt, gas oil, residual oil, tar-sand oil, shale oil, coal oil; aromatic hydrocarbons such as benzene, toluene, xylene fractions, coal tar, cycle gas oil from fluid-catalytic-cracking operation; furfural extract of coker gas oil; and mixtures thereof.

12. The process of claim 1 wherein said hydrocarbonaceous fuel is a gaseous hydrocarbon.

13. The process of claim 1 wherein said hydrocarbonaceous fuel is an oxygen containing liquid hydrocarbonaceous organic material selected from the group consisting of carbohydrates, cellulosic materials, aldehydes, organic acids, alcohols, ketones, oxygenated fuel oil, waste liquids and by-products from chemical processes containing oxygenated hydrocarbonaceous organic materials and mixtures thereof.

14. The process of claim 1 wherein said hydrocarbonaceous fuel is a pumpable slurry of solid carbonaceous fuel selected from the group consisting of coal, particulate carbon, petroleum coke, concentrated sewer sludge in a vaporized carrier such as water, liquid hydrocarbon fuel and mixtures thereof.

15. The process of claim 1 further provided with the step of preheating the hydrocarbonaceous fuel to a temperature up to about 800°F. but below its cracking temperature prior to introducing said fuel into the gas generator in step (1).

16. The process of claim 1 further provided with the steps of cooling the effluent gas stream from step (1) by indirect heat exchange with water to produce steam, introducing at least a portion of said steam into a steam turbine driving a turbocompressor, compressing air in said turbocompressor, introducing said compressed air into an air separation unit in which oxygen and nitrogen are separated from the air feed, and compressing at least a portion of said oxygen and introducing same into said gas generator as at least a portion of said free-oxygen-containing gas.

17. The process of claim 16 further provided with the step of introducing at least a portion of said separated nitrogen into the gas purification zone to aid in the separation of gaseous impurities from the stream of fuel gas.

18. The process of claim 1 wherein the power developed in step (4) is used to drive an electric generator, gas compressor, or pump.

19. The process of claim 1 provided with the step of admixing a portion of the $CO_2$-rich gas stream from step (2) with the effluent gas stream from step (1) and subjecting the mixture to noncatalytic reverse thermal water-gas shift reaction to increase the mole ratio ($CO/H_2$) of the process gas stream to a value greater than 1.3.

20. A process for the generation of power by means of a gas turbine wherein a hydrocarbonaceous fuel is gasified to produce a fuel gas which is burned in a combustion chamber to produce a flue gas which is introduced into a power-developing expansion turbine, the improvement which comprises:
1. reacting by partial oxidation a liquid hydrocarbon fuel with a free-oxygen containing gas, in the presence of a temperature moderating gas, said reaction taking place in the reaction zone of a noncatalytic freeflow gas generator at an autogenous temperature in the range of about 1,500° to 3,500°F. and at a pressure in the range of about 10 to 180 atmospheres absolute to produce an effluent gas stream principally comprising $H_2$, CO, $CH_4$, $CO_2$, $H_2O$, and $N_2$ and minor amounts of COS, $H_2S$, Ar and particulate carbon.
2. mixing a supplemental $CO_2$-rich gas stream produced subsequently in the process with the effluent gas stream from (1) and in a free-flow thermal shift conversion zone subjecting the resulting mixed gas stream to noncatalytic thermal reverse water-gas shift reaction at a temperature of at least 1,500°F., thereby increasing the mole ratio ($CO/H_2$) dry basis of the effluent gas stream from (1).
3. cooling the effluent gas from (2) by indirect heat exchange with water thereby producing steam;
4. introducing the cooled effluent gas from (3) into a gas cleaning and purification zone and separately obtaining therefrom a stream of clean fuel gas comprising mixtures of $H_2$ and Co and one or more members of the group $N_2$, $CH_4$, $CO_2$ and $H_2O$; a $CO_2$-rich gas stream; a slurry stream comprising particulate carbon and a liquid carrier, and a gas stream rich in $H_2S$ and COS.

5. introducing at least a portion of the $CO_2$-rich gas stream from (4) into (2) as said supplemental $CO_2$-rich gas stream;

6. introducing into the combusion chamber of said gas turbine and burning therein the stream of improved fuel gas from (4) and at least a portion of a gaseous oxidizing stream produced subsequently in the process to produce a stream of clean flue gas at a temperature in the range of about 1,400° to 3,000°F.; and 7. passing the stream of clean flue gas from (6) through said expansion turbine as the working fluid to develop power and to produce clean exhaust flue gas, and mixing at least a portion of said clean exhaust flue gas with air to produce the gaseous oxidizing stream in (6).

21. The process of claim 20 provided with the added step of preheating the clean fuel gas from step (4) to a temperature in the range of about 400° to 800°F. by indirect heat exchange with a portion of the exhaust flue gas from step (7) before said fuel gas is burned in step (6), and then expanding the exhaust flue gas to the atmosphere by way of a power producing expansion turbine.

22. The process of claim 20 wherein the gaseous oxidizing stream from step (7) is compressed by a compressor driven by the expansion turbine in step (7) to a pressure in the range of over 10 to 190 atmospheres, and preheated to a temperature in the range of about 400° to 800°F. by indirect heat exchange with a portion of said exhaust flue gas from step (7) prior to at least a portion of said gaseous oxidizing stream being introduced into the combustion chamber in step (6).

23. The process of claim 22 with the additional step of introducing a portion of said compressed and preheated gaseous oxidizing stream into the reaction zone of the gas generator in step (1) as at least a portion of said temperature moderating gas.

24. The process of claim 20 further provided with the step of introducing a portion of the $CO_2$-rich gas stream from step (4) into the gas generator in (1) as at least a portion of said temperature moderating gas.

25. The process of claim 20 further provided with the step of compressing air in a compressor driven by the expansion turbine in step (7) to a pressure greater than that in said gas generator, and introducing said compressed air into the gas generator in step (1), as at least a portion of said free-oxygen containing gas.

26. The process of claim 20 whereby the improved fuel gas stream separated in step (4) has a heat of combustion in the range of about 75 to 350 BTU/SCF.

27. The process of claim 20 where the pressure in the system up through the combustion chamber in step (6) is substantially the same as that in the gas generator in step (1) less ordinary pressure drop in the line.

28. The process of claim 20 with the additional step of introducing steam into the combustion chamber in step (6).

* * * * *

PO-1050
(5/69)

UNITED STATES PATENT OFFICE
CERTIFICATE OF CORRECTION

Patent No. 3,866,411     Dated February 12, 1975

Inventor(s) C. P. Marion, W. G. Schlinger, A. Brent & J. Muenger

It is certified that error appears in the above-identified patent and that said Letters Patent are hereby corrected as shown below:

Col. 13 line 17    After "pressor" insert --171, and line 172. The mixture of air and clean exhaust--

Signed and Sealed this second Day of December 1975

[SEAL]

Attest:

RUTH C. MASON
*Attesting Officer*

C. MARSHALL DANN
*Commissioner of Patents and Trademarks*